(12) United States Patent
Hara et al.

(10) Patent No.: US 7,710,490 B2
(45) Date of Patent: May 4, 2010

(54) PORTABLE IMAGE COMMUNICATION SYSTEM, TRANSMITTING AND RECEIVING UNITS CONSTRUCTING SAID SYSTEM, AND METHODS OF CONTROLLING SAID UNITS

(75) Inventors: Toshita Hara, Tokyo (JP); Noriko Katayama, Tokyo (JP); Takeharu Omata, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 496 days.

(21) Appl. No.: 11/715,446

(22) Filed: Mar. 8, 2007

(65) Prior Publication Data
US 2007/0211159 A1    Sep. 13, 2007

(30) Foreign Application Priority Data
Mar. 9, 2006    (JP)    ............................. 2006-063450

(51) Int. Cl.
*H04N 5/222*    (2006.01)
(52) U.S. Cl. ............................. 348/333.05; 348/211.1; 348/333.02
(58) Field of Classification Search ............. 348/14.01, 348/14.12, 211.1–211.3, 333.02, 333.05
See application file for complete search history.

(56) References Cited

U.S. PATENT DOCUMENTS

| | | | |
|---|---|---|---|
| 6,188,431 B1* | 2/2001 | Oie | 348/211.5 |
| 7,385,635 B2* | 6/2008 | Kobayashi et al. | 348/231.99 |
| 2007/0252901 A1* | 11/2007 | Yokonuma et al. | 348/231.1 |

FOREIGN PATENT DOCUMENTS

| | | |
|---|---|---|
| JP | 2000-137827 | 5/2000 |
| JP | 2005-175794 | 6/2005 |

* cited by examiner

*Primary Examiner*—Gevell Selby
(74) *Attorney, Agent, or Firm*—McGinn IP Law Group, PLLC

(57) ABSTRACT

When image data is sent and received between cameras via communication, it is possible for the user to ascertain the images that are being communicated. Thumbnail image data for transfer purposes is transmitted from a transmit-side camera to a receive-side camera. Main (full-size) image data is thenceforth transmitted from the transmit-side camera to the receive-side camera. When the main image data is sent and received, display screens on respective ones of the cameras display an image in which a transfer thumbnail image represented by transfer thumbnail image data moves from the display screen on the transmitting side to the display screen on the receiving side.

17 Claims, 15 Drawing Sheets

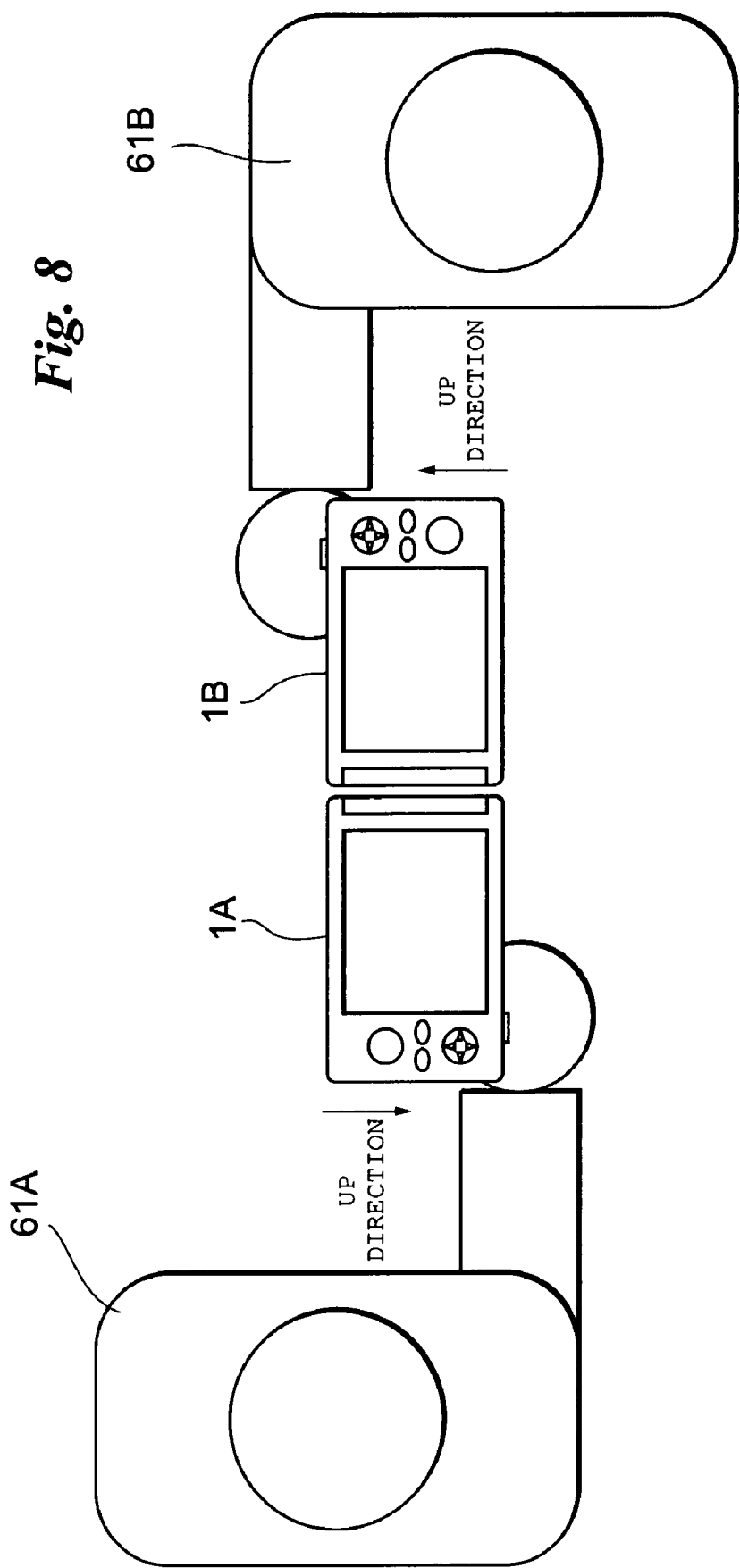

WHEN TRANSFER THUMBNAIL
IMAGE DATA IS SENT AND RECEIVED

WHEN MAIN IMAGE DATA
IS SEND AND RECEIVED

WHEN MAIN IMAGE DATA IS SEND AND RECEIVED

WHEN MAIN IMAGE DATA IS SEND AND RECEIVED

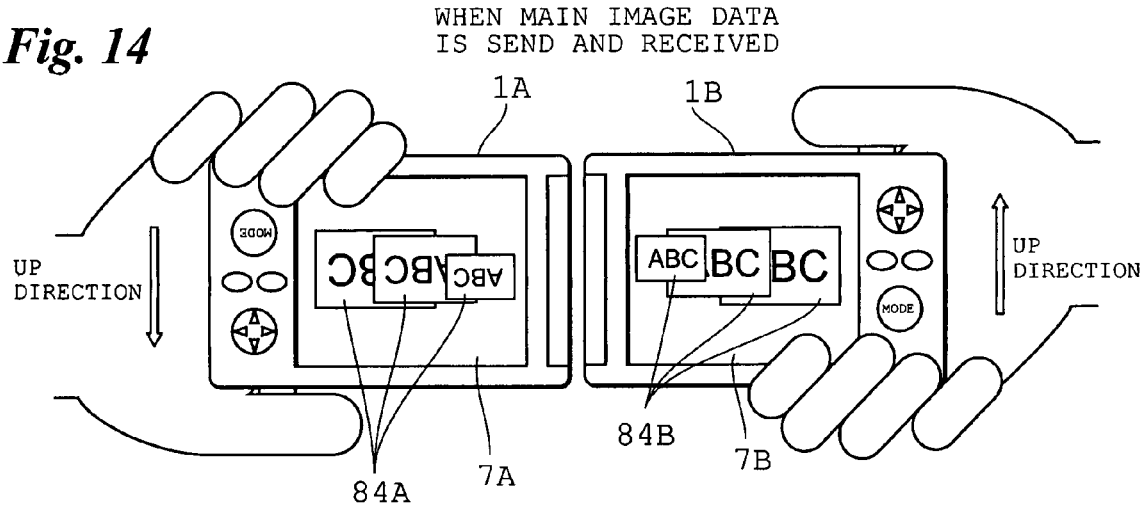

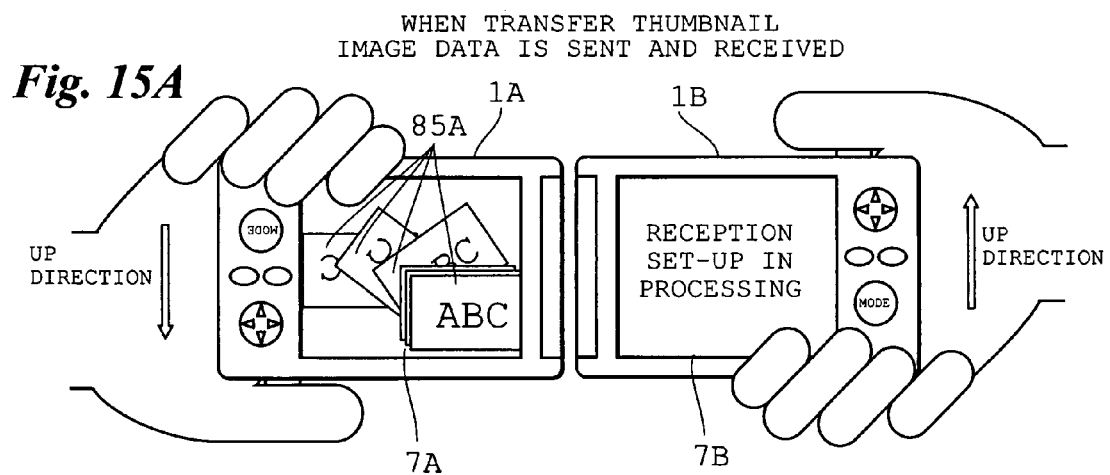
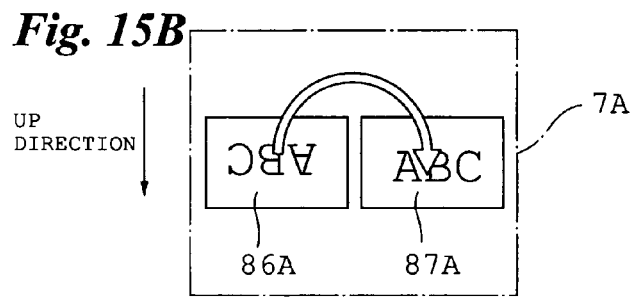
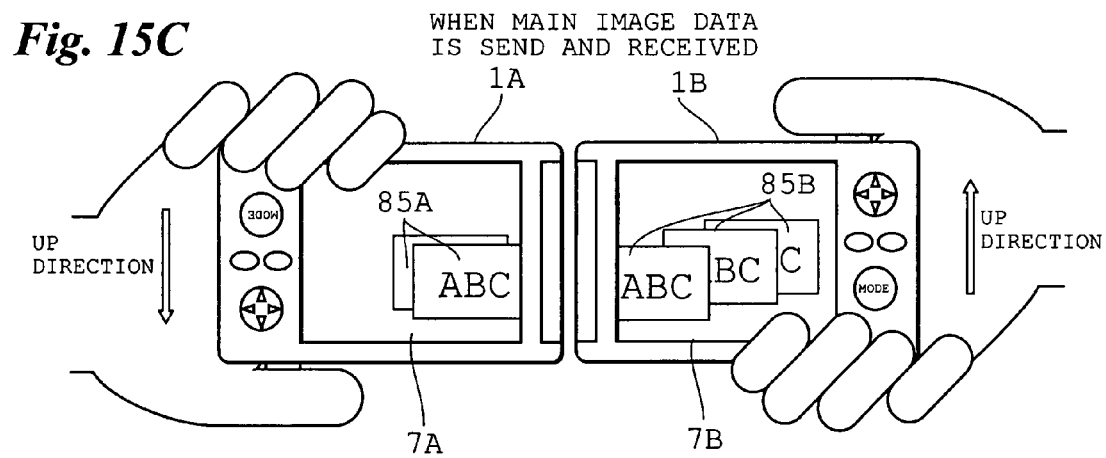
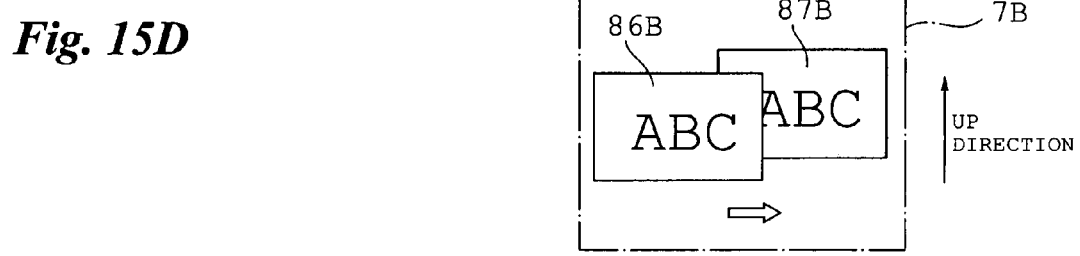

PORTABLE IMAGE COMMUNICATION SYSTEM, TRANSMITTING AND RECEIVING UNITS CONSTRUCTING SAID SYSTEM, AND METHODS OF CONTROLLING SAID UNITS

BACKGROUND OF THE INVENTION

1. Field of the Invention

This invention relates to a portable image communication system, a transmitting unit and a receiving unit that construct the system, and methods of controlling the transmitting and receiving units.

2. Description of the Related Art

There are occasions where image data is transmitted from one digital still camera to another. Such transmission makes it possible for image data obtained by photography using one digital still camera to be stored in the other digital still camera. In order to notify the user of the status of transmission of the image data, the user is informed of the number of images for which transmission has been completed (see the specification of Japanese Patent Application Laid-Open No. 2005-175794).

Further, in a case where the image data is transmitted to an apparatus such as a computer, printer or facsimile machine, there are instances where an animation is displayed (see the specification of Japanese Patent Application Laid-Open No. 2000-137827).

However, the user cannot determine what image is being transmitted.

SUMMARY OF THE INVENTION

Accordingly, an object of the present invention is to so arrange it that the user can tell what image is being transmitted.

The present invention provides a portable image communication system comprising a portable image transmitting unit and a portable image receiving unit.

The portable image transmitting unit includes a thumbnail image data transmitting device (means) for transmitting thumbnail image data which represents a transfer thumbnail image corresponding to a main image, to the portable image receiving unit; and the portable image receiving unit includes a thumbnail image data receiving device (means) for receiving thumbnail image data that has been transmitted from the thumbnail image data transmitting device of the portable image transmitting unit; and a reception-end data transmitting device (means) for transmitting reception-end data to the portable image transmitting unit in response to end of reception of the thumbnail image data by the thumbnail image data receiving device.

The portable image transmitting unit includes an end-data receiving device (means) for receiving reception-end data that has been transmitted from the reception-end data transmitting device; a main image data transmitting device (means) for transmitting main image data, which represents the main image, to the portable image receiving unit in response to reception of the reception-end data by the end-data receiving device; and a transmit-side display unit for displaying the transfer thumbnail image in such a manner that the transfer thumbnail image gradually disappears while it moves in one direction on a display screen in response to transmission of the main image data by the main image data transmitting-device. The portable image receiving unit further includes a main image data receiving device (means) for receiving-main image data that has been transmitted from the portable image transmitting unit; and a receive-side display unit for displaying the transfer thumbnail image in such a manner that the transfer thumbnail image gradually appears while it moves in one direction on a display screen in response to reception of the main image data by the main image data receiving device.

The portable image transmitting unit and portable image receiving unit that construct the above-described portable image communication system may each stand-alone units.

The present invention also provides a method of controlling the above-described portable image transmitting unit. Specifically, the method comprises the steps of: transmitting thumbnail image data, which represents a transfer thumbnail image corresponding to a main image, to a portable image receiving unit; receiving reception-end data that indicates end of transmission of the thumbnail image data that is transmitted from the portable image receiving unit in response to transmission of the thumbnail image data to the portable image receiving unit; transmitting main image data representing the main image to the portable image receiving unit in response to reception of the reception-end data; and displaying the transfer thumbnail image in such a manner that the transfer thumbnail image gradually disappears while moving in one direction on a display screen in response to transmission of the main image data.

The present invention also provides a method of controlling the above-described portable image receiving unit. Specifically, the method comprises the steps of: receiving thumbnail image data representing a transfer thumbnail image corresponding to a main image that has been transmitted from a portable image transmitting unit; transmitting reception-end data to the portable image transmitting unit in response to end of reception of the thumbnail image data; receiving main image data, which is transmitted from the portable image transmitting unit, in response to transmission of the reception-end data to the portable image transmitting unit; and displaying the transfer thumbnail image in such a manner that the transfer thumbnail image gradually appears while moving in one direction on a display screen in response to reception of the main image data.

In accordance with the present invention, thumbnail image data representing a transfer thumbnail image corresponding to a main image is transmitted from the portable image transmitting unit to the portable image receiving unit. The thumbnail image data is received by the portable image receiving unit. When reception ends, reception-end data is transmitted from the portable image receiving unit to the portable image transmitting unit. When the reception-end data is received by the portable image transmitting unit, main image data corresponding to the thumbnail image data already transmitted is transmitted from the portable image transmitting unit to the portable image receiving unit, and the transfer thumbnail image is displayed on the display screen of a transmit-side display unit of the image transmitting unit in such a manner that the transfer thumbnail image gradually disappears while it moves in one direction on the display screen. When the main image data that has been transmitted from the image transmitting unit is received by the image receiving unit, the transfer thumbnail image is displayed on the display screen of a receive-side display unit in such a manner that the transfer thumbnail image gradually appears while it moves in one direction on the display screen.

Since a transfer thumbnail image corresponding to main image data that is being transmitted from the image transmitting unit to the image receiving unit is displayed just as if it were being moved from the image transmitting unit to the image receiving unit, the user can tell at a glance what image is represented by the main image data that is being transmitted from the image display unit to the image receiving unit (received by the image receiving unit from the image transmitting unit). Further, by observing the manner in which the transfer thumbnail image is moving, it can be confirmed that transmission (reception) of the main image data is in progress. Furthermore, since the transmission of the thumbnail image data ends before the transmission of the main image, main image data that has not been received can be found by comparing the main image data and the thumbnail image data in the image receiving unit.

By way of example, in the portable image transmitting unit, the thumbnail image data transmitting device and the main image data transmitting device are a wireless communication device provided on an end face of the portable image transmitting unit. In this case, the display unit on the transmit side would display the transfer thumbnail image in such a manner that the thumbnail image gradually disappears while it moves on the display screen toward the side on which the wireless communication device has been provided, in response to transmission of the main image data by the main image data transmitting device.

In this case, in the portable image receiving unit, the thumbnail image data receiving device and the main image data receiving device would also be a wireless communication device provided on an end face of the portable image receiving unit. The display unit on the receive side would display the transfer thumbnail image in such a manner that the thumbnail image gradually appears while it moves on the display screen toward the side opposite the side on which the wireless communication device is provided, in response to reception of the main image data by the main image data receiving device.

The portable image transmitting unit may further include a display control device (means) for controlling the transmit-side display unit in such a manner that images obtained by turning transfer thumbnail images upside-down are displayed in a gradually stacked manner while moving on the display screen toward the side on which the wireless communication device has been provided, in response to transmission of the transfer thumbnail image data by the thumbnail image data transmitting device.

Further, the transmit-side display unit may display the transfer thumbnail image in such a manner that the transfer thumbnail image data moves on the display screen toward the side on which the wireless display device has been provided while it is rotated clockwise by 90° from an upright attitude, and gradually disappears before or after rotation ends, in response to transmission of the main image data by the main image data transmitting device.

In this case, the receive-side display unit of the portable image receiving unit displays the transfer thumbnail image in such a manner that the transfer thumbnail image, which has been rotated clockwise by 90° from an upright attitude, gradually appears while moving on the display screen toward the side opposite the side on which the wireless communication device has been provided, and displays the transfer thumbnail image in the upright attitude while rotating the thumbnail image clockwise by a further 90° before one frame of the transfer thumbnail image appears completely or after it has appeared completely, in response to reception of the main image data by the main image data receiving device.

The transmit-side display unit of the portable image transmitting unit may subject the transfer thumbnail image to the rotation processing after movement thereof starts.

In this case, the receive-side display unit of the portable image receiving unit may move the transfer thumbnail image toward the side opposite the side on which the wireless communication device has been provided after rotation of the transfer thumbnail image clockwise by 90° has been completed.

The receive-side display unit of the portable image receiving unit may display an image, which has been obtained by turning the transfer thumbnail image upside down, in such a manner that the image gradually appears while it moves on the display screen toward the side opposite the side on which the wireless communication device has been provided, in response to reception of the main image data by the main image data transmitting device.

The transmit-side display unit of the portable image transmitting unit may display the transfer thumbnail image in such a manner that the transfer thumbnail image disappears while it is gradually reduced in size and moving on the display screen toward the side on which the wireless communication device has been provided, in response to transmission of the main image data by the main image data transmitting device.

In this case, the receive-side display unit of the portable image receiving unit preferably displays the transfer thumbnail image in such a manner that the transfer thumbnail image appears while it is gradually increased in size and moving on the display screen, in response to reception of the main image data by the main image data receiving device.

The portable image transmitting unit may further include a display control device (means) for controlling the display unit in such a manner that the transfer thumbnail image is displayed in a stacked manner while being rotated from an upright state to an inverted state while moving on the display screen toward the side on which the wireless communication device has been provided, in response to transmission of the thumbnail image data by the thumbnail image data transmitting device.

The portable image transmitting unit may further include a display control device (means) for controlling the display unit in such a manner that the transfer thumbnail image is displayed in a stacked manner while being rotated clockwise by 90° from an upright attitude, in response to transmission of the thumbnail image data by the thumbnail image data transmitting device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 illustrates the manner in which image data is sent and received;

FIG. 14 illustrates the manner in which image data is sent and received; and

FIGS. 15A and 15C illustrate the manner in which image data is sent and received, FIG. 15B illustrates an example of a display screen on the transmit side, and FIG. 15D illustrates an example of a display screen on the receive side;

DESCRIPTION OF THE PREFERRED EMBODIMENTS

Preferred embodiments of the present invention will now be described in detail with reference to the accompanying drawings.

Figure 1:
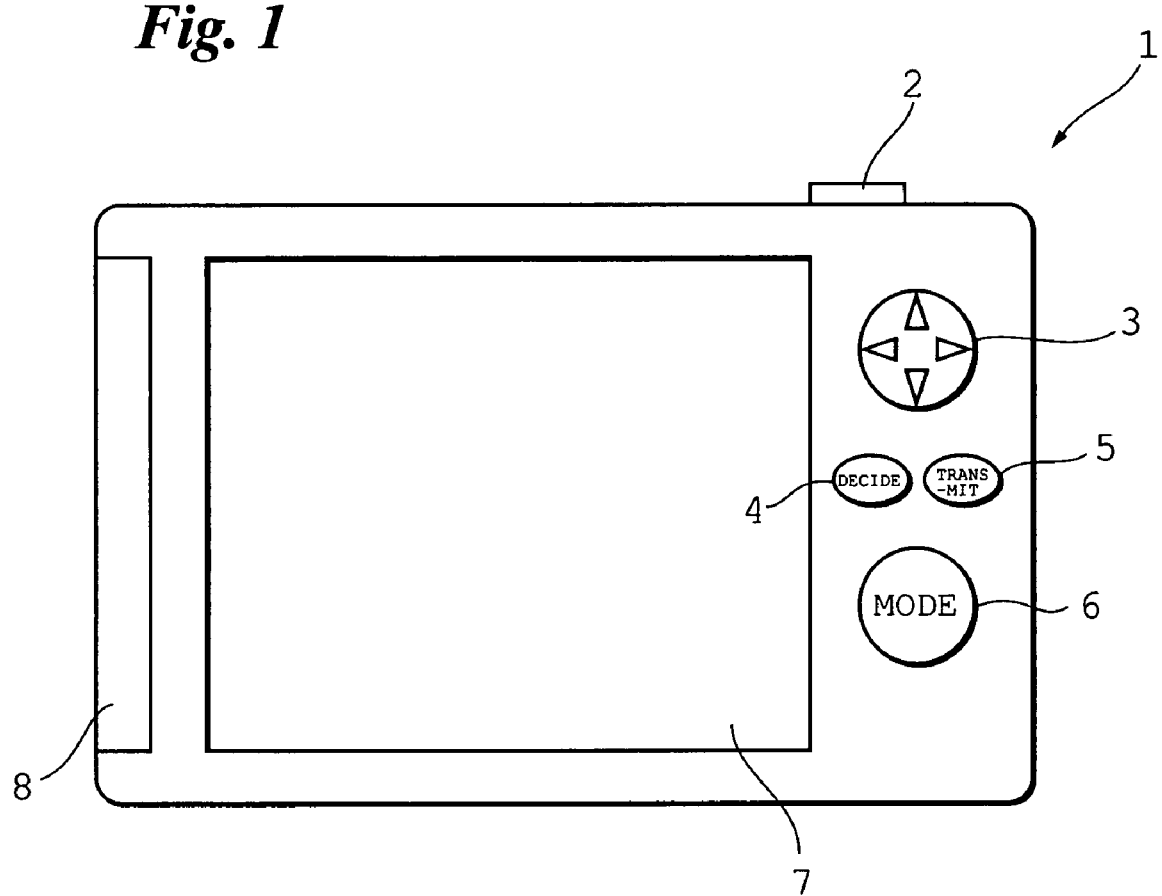
FIG. 1 is a back view of a digital still camera.

FIG. 1 is a back view of a digital still camera 1 according to an embodiment of the present invention.

The digital still camera 1 according to this embodiment is capable of sending and receiving image data.

A shutter-release button 2 is provided at the right side of the upper surface of the digital still camera 1.

The back side of the digital still camera 1 is formed to have a liquid crystal display screen 7 substantially over the entirety thereof. Provided at the upper right of the display screen 7 is a so-called cross-hair key 3 on which up, down, left and right arrows are formed in such a manner that they can be pressed. Provided below the cross-hair key 3 are a decision button 4 pressed by the user when image data to be transmitted is decided, and a transmit button 5 for starting the transmission of image data. A mode setting dial 6 is provided below the decision button 4 and transmit button 5. Modes that can be set by the mode setting dial 6 include an image sensing mode, a playback mode, a transmit mode and a receive mode.

An input/output portion 8 of communication unit for sending and receiving image data is formed on the left side face (the left side face as seen from the back side) of the digital still camera 1.

Figure 2:
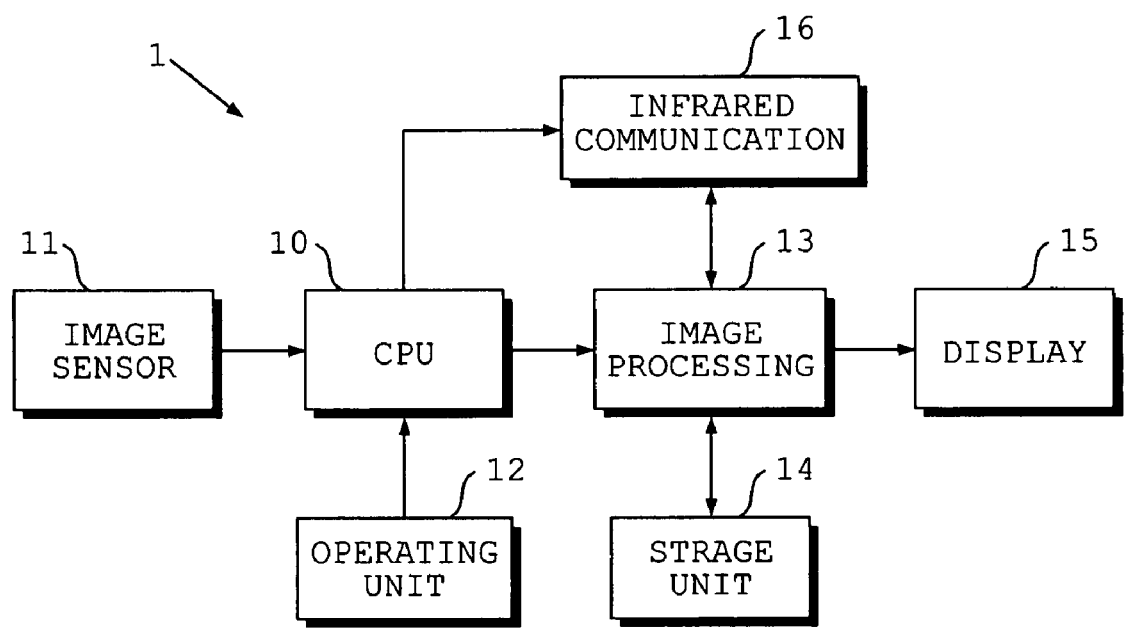
FIG. 2 is a block diagram illustrating the electrical structure of the digital still camera.

FIG. 2 is a block diagram illustrating the electrical structure of the digital still camera 1.

The operation of the overall digital still camera 1 is controlled by a CPU 10.

The digital still camera 1 includes an operating unit 12 having a variety of buttons such as the shutter-release button 2. Output signals from the operating unit 12 are input to the CPU 10.

If the image sensing mode is set, main (i.e., full-size) image data representing the image of a subject sensed by an image sensing unit 11 is input to an image processing unit 13 via the CPU 10. By subjecting the image data to prescribed image processing in the image processing unit 13 and applying the processed image data to a display unit 15, the image of the subject is displayed on the display screen of the display unit 15. If the shutter-release button 2 is pressed, the main image data thus obtained is applied to and stored in a storage unit 14.

The image processing unit 13 also executes processing (memory mapping processing for display) for displaying an image, such processing including processing for moving and rotating a thumbnail image that is for transfer purposes (such thumbnail image data will also be referred to as "transfer thumbnail image data" below), as will be described later.

If the transmit mode is set, transfer thumbnail image data representing an image that has been selected by the user is transmitted from an infrared communication unit 16 to a digital still camera on a receiving side. After the transfer thumbnail image data is transmitted, main image data, which corresponds to the above-mentioned transfer thumbnail image data, is transmitted from the infrared communication unit 16 to the digital still camera on the receiving side. While the transmission of the main image data is in progress, the transfer thumbnail image represented by the transfer thumbnail image data corresponding to this main image data is displayed on the display screen of the display unit 15 while it is moved just as if it were being sent to the digital still camera on the receiving side. By observing the transfer thumbnail image being displayed, the user can tell that processing for transmitting the main image data is in progress and can confirm what subject image is represented by the image data that is being transmitted. The amount of transfer thumbnail image data is decided in accordance with the transmission speed of the infrared communication unit 16 and the display speed of the display unit 15. Generally, the amount of transfer thumbnail image data is less than the amount of main image data. Further, the transfer thumbnail image data may be generated when the main image data is stored in the storage unit 14, or may be generated after the transmit mode is set and the image to be transmitted decided.

The digital still camera on the receiving side is set to the receive mode. Transfer thumbnail image data that has been transmitted from the digital still camera 1 on the transmitting side is stored in the digital still camera on the receiving side. When reception of main image data starts, a transfer thumbnail image represented by transfer thumbnail image data corresponding to the main image data being received is displayed while being moved on the display screen of the display unit on the receiving side. By observing the transfer thumbnail image being displayed, the user also of the digital still camera on the receiving side can tell that processing for receiving the image data is in progress and can confirm what subject image is represented by the image data that is being received. It goes without saying that the amount of transfer thumbnail image data is decided taking into consideration the reception speed of the infrared communication unit 16 and the display speed of the display unit 15 of the digital still camera on the receiving side.

Figure 3:
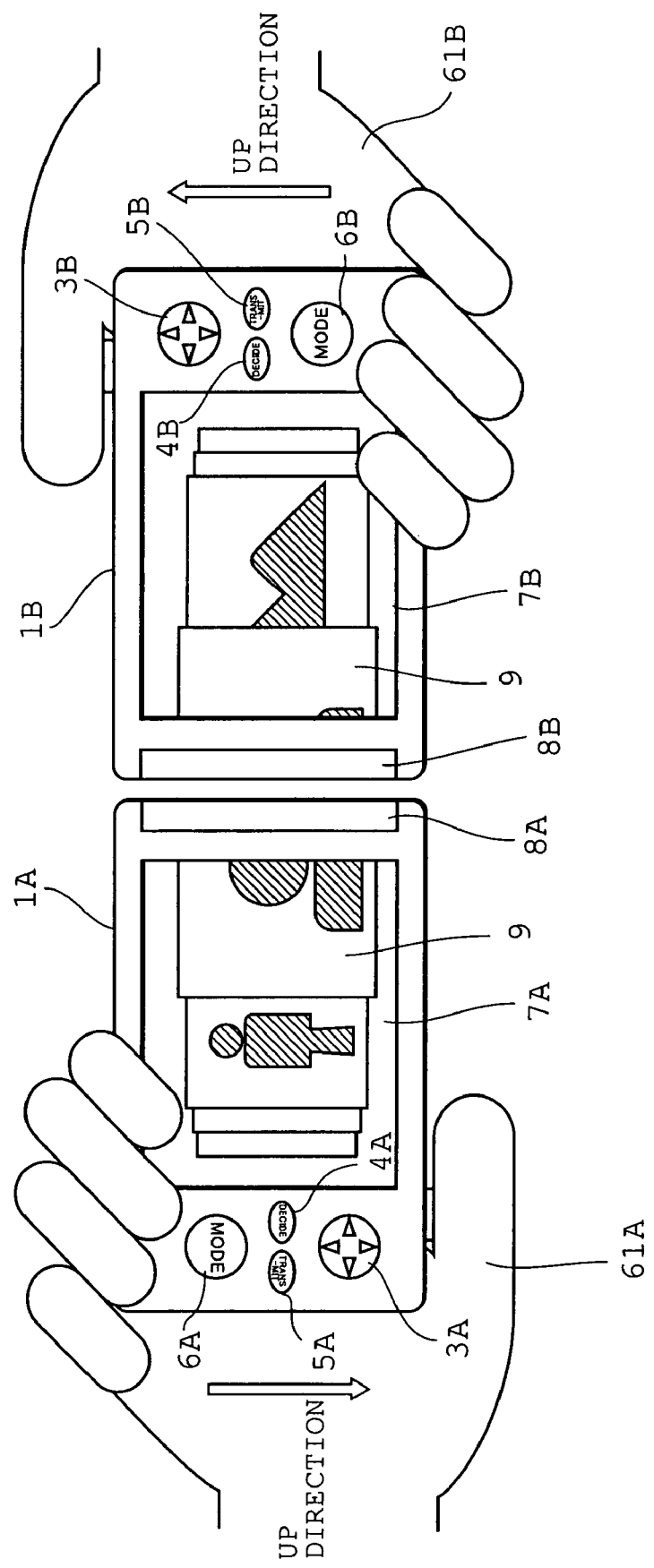
FIG. 3 illustrates the manner in which image data is sent and received.

FIG. 3 illustrates the situation when image data is being sent and received using a transmit-side digital still camera and a receive-side digital still camera.

A transmit-side user 61A holds a transmit-side digital still camera 1A in his/her right hand, and a receive-side user 61B holds a receive-side digital still camera 1B in his/her right hand. The reference characters of the portions constituting the transmit-side digital still camera 1A and receive-side digital still camera 1B are obtained by appending A and B to the reference characters of the portions described above in conjunction with FIG. 1. These portions need not be described again.

The transmit-side digital still camera 1A is held by the transmit-side user 61A and the receive-side digital still camera 1B is held by the receive-side user 61B in such a manner that the input/output portion 8A of the communication unit of the transmit-side digital still camera 1A and the input/output portion 8B of the communication unit of the transmit-side digital still camera 1B will point toward each other.

When main image data is sent and received, an image 9 is displayed on display screen 7A of the transmit-side digital still camera 1A and on display screen 7B of the receive-side digital still camera 1B so as to move from the transmit-side digital still camera 1A to the receive-side digital still camera 1B in the manner described above.

Figure 4:
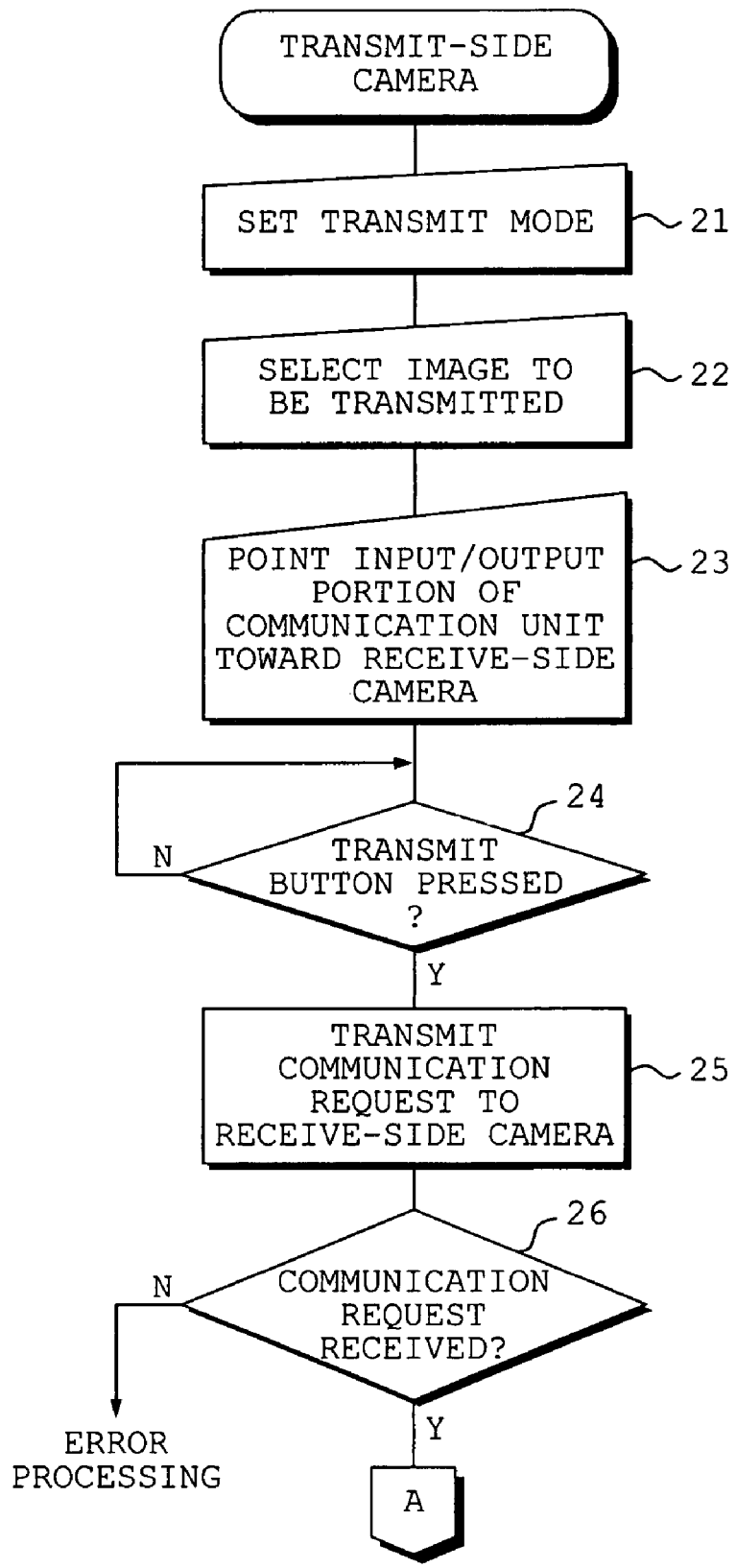
FIG. 4 is a flowchart illustrating part of processing executed by a camera on the transmit side.
Figure 5:
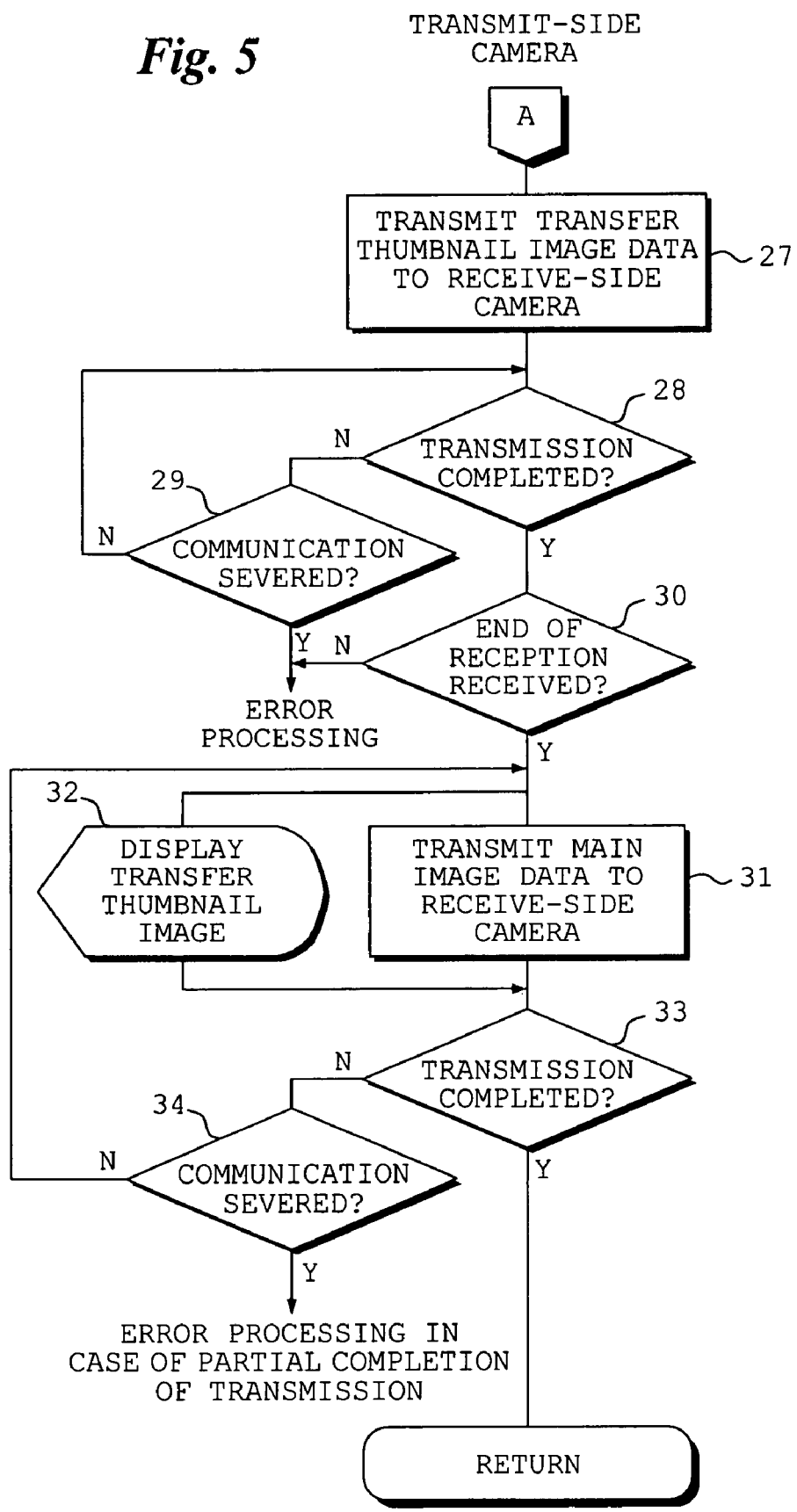
FIG. 5 is a flowchart illustrating part of processing executed by the camera on the transmit side.
Figure 6:
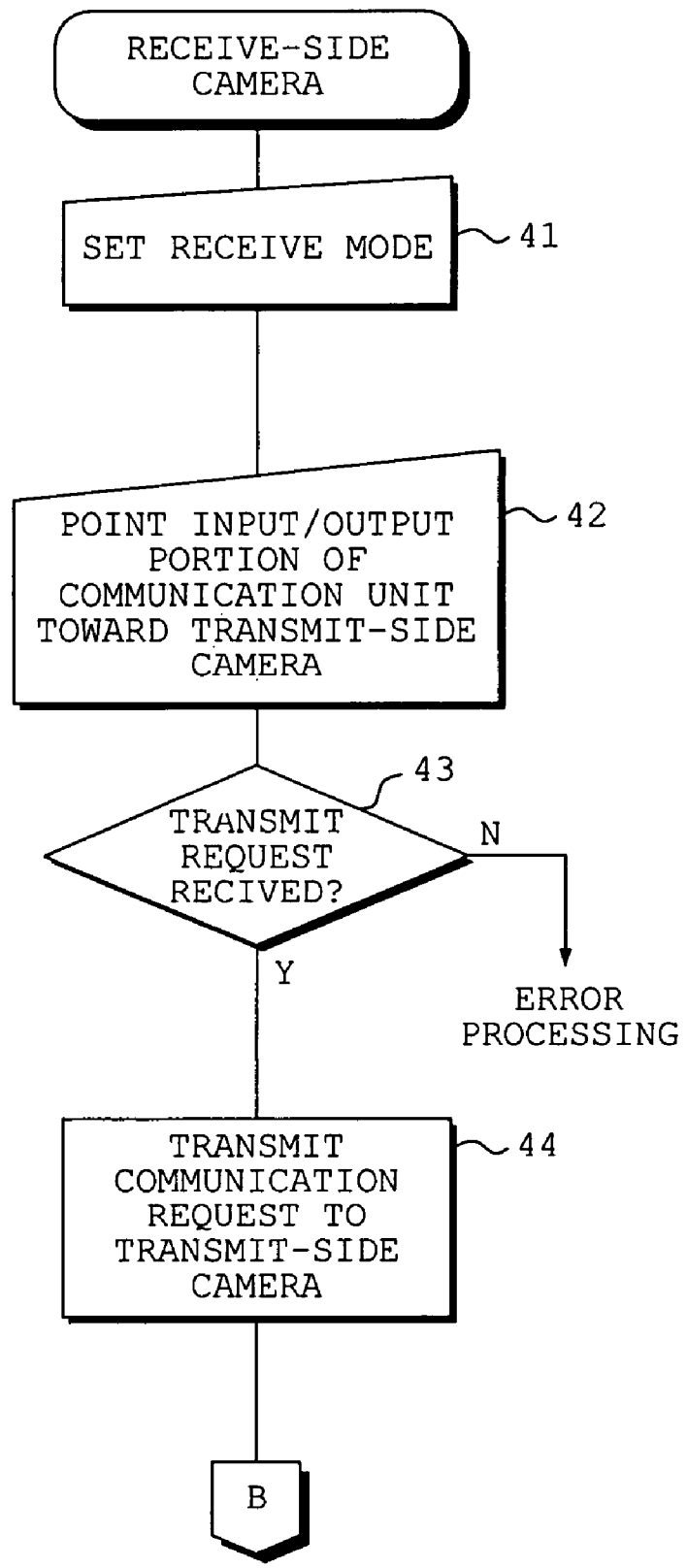
FIG. 6 is a flowchart illustrating part of processing executed by a camera on the receive side.
Figure 7:
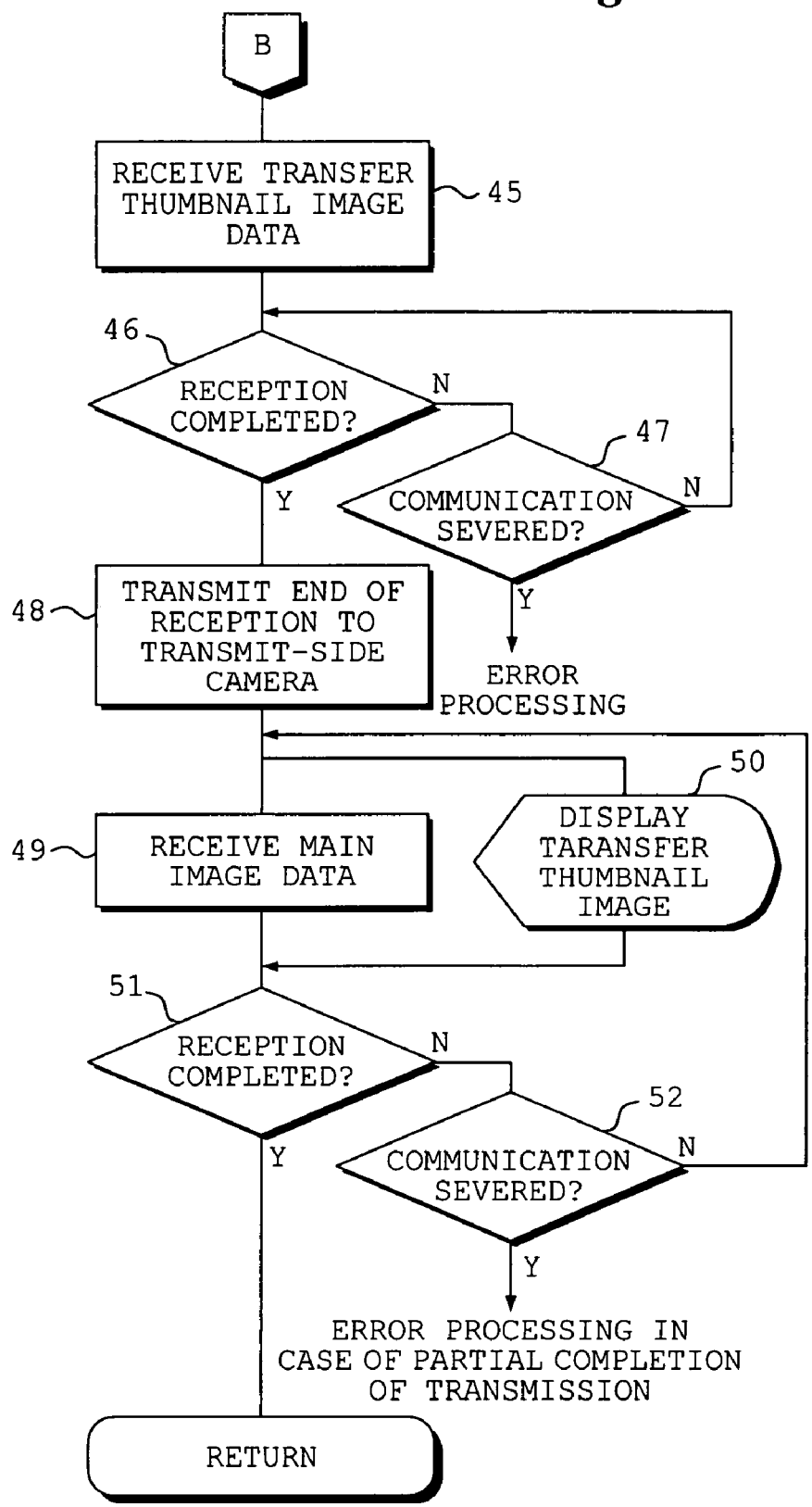
FIG. 7 is a flowchart illustrating part of processing executed by the camera on the receive side.

FIGS. 4 to 7 are flowcharts illustrating processing executed when main image data is transmitted from the transmit-side digital still camera 1A (referred to as "transmit-side camera 1A" below) to the receive-side digital still camera 1B (referred to as "receive-side camera 1B" below). FIGS. 4 and 5 are flowcharts illustrating processing executed by the transmit-side camera 1A, and FIGS. 6 and 7 are flowcharts illustrating processing executed by the transmit-side camera 1B.

The transmit-side camera 1A is set to the transmit mode (step 21 in FIG. 4). When this is done, thumbnail images represented by image data that has been stored is displayed as a list on the display screen 7A on the transmitting side. A thumbnail image corresponding to image data to be transmitted to the receive-side camera 1B is selected from among the thumbnail images displayed (step 22 in FIG. 4). Next, the input/output portion 8A of the communication unit is pointed toward the receive-side camera 1B by the user of the transmit-side camera 1A (step 23 in FIG. 4).

The receive-side camera 1B is set to the receive mode (step 41 in FIG. 6). The input/output portion 8B of the communication unit is pointed toward the transmit-side camera 1A by the user of the receive-side camera 1B (step 42 in FIG. 6).

As illustrated in FIG. 3, the input/output portion 8A of the communication unit of transmit-side camera 1A and the input/output portion 8B of the communication unit of receive-side camera 1B are pointed toward each other.

If the transmit button 5A of transmit-side camera 1A is pressed ("YES" at step 24 in FIG. 4), a communication request is transmitted from transmit-side camera 1A to receive-side camera 1B (step 25 in FIG. 4). When the receive-side camera 1B receives the communication request ("YES" at step 43 in FIG. 6), a communication response is transmitted from the receive-side camera 1B to the transmit-side camera 1A (step 44 in FIG. 6).

When the communication response that has been transmitted from the receive-side camera 1B is received by the transmit-side camera 1A ("YES" at step 26 in FIG. 4), transfer thumbnail image data corresponding to the selected image is transmitted from the transmit-side camera 1A to the receive-side camera 1B (step 27 in FIG. 5). If communication is severed ("YES" at step 29 in FIG. 5) before end of transmission of all of the transfer thumbnail image data that corresponds to all of the images selected ("NO" at step 28 in FIG. 5), then prescribed error processing is executed.

The transfer thumbnail image data that has been transmitted from the transmit-side camera 1A is received by the receive-side camera 1B (step 45 in FIG. 7). If communication ends ("YES" at step 47 in FIG. 7) before all of the transfer thumbnail image data transmitted from the transmit-side camera 1A is received ("NO" at step 46 in FIG. 7), then prescribed error processing is executed. If all of the transfer thumbnail image data that is transmitted from the transmit-side camera 1A is received by the receive-side camera 1B ("YES" at step 46 in FIG. 7), then data indicating end of reception is transmitted from the receive-side camera 1B to the transmit-side camera 1A (step 48 in FIG. 7).

When the data indicative of end of reception transmitted from the receive-side camera 1B is received by the transmit-side camera 1A ("YES" at step 30 in FIG. 5), main image data corresponding to the transfer thumbnail image data that has been transmitted is read out of the storage unit and transmitted to the receive-side camera 1B (step 31 in FIG. 5). While transmission of the main image data is in progress, the transfer thumbnail image represented by the transfer thumbnail image data corresponding to the main data being transmitted is displayed on the display screen of the transmit-side camera 1A so as to move toward receive-side camera 1B (step 32 in FIG. 5) in the manner described above.

The main image data that has been transmitted from the transmit-side camera 1A is received by the receive-side camera 1B (step 49 in FIG. 7). While reception of the main image data is in progress, the transfer thumbnail image data corresponding to the main image data being received is displayed on the display screen of the receive-side camera 1B so as to move from the transmit-side camera 1A (step 50 in FIG. 7).

If communication is severed ("YES" at step 34 in FIG. 5) at the transmit-side camera 1A before transmission of all of the main image data ends ("NO" at step 33), the prescribed error processing is executed. Transmission of the main image data and display of the transfer thumbnail image data are carried out until the transmission of all of the main image data ends (steps 31, 32 in FIG. 5).

If communication is severed ("YES" at step 52 in FIG. 7) at the receive-side camera 1B before the reception of all of the main image data ends ("NO" at step 51), then prescribed error processing is executed. Reception of the main image data and display of the transfer thumbnail image data are carried out until the reception of all of the main image data ends (steps 49, 50 in FIG. 7).

FIG. 8 illustrates the manner, as seen from above, in which the transmit-side user 61A holds the transmit-side camera 1A, the receive-side user 61B holds the receive-side camera 1B and image data is sent and received.

In a case where the input/output portion of the communication unit of transmit-side camera 1A and the input/output portion of the communication unit of transmit-side camera 1B are pointed toward each other, the up-down direction of the transmit-side camera 1A and the up-down direction of the receive-side camera 1B become the opposite of each other. (The side on which the shutter-release button is provided is the top side of the camera. Refer also to FIG. 3.) Consequently, unless a transfer thumbnail image displayed on the transmit-side camera 1A and a transfer thumbnail image displayed on the receive-side camera 1B are displayed in an upside-down relationship with respect to each other, and unless the lateral directions of movement of the images are made the opposite of each other (i.e., unless the image is made to approach the input/output portion 8A of transmit-side camera 1A and to move away from the input/output portion 8B of receive-side camera 1B), the image will not appear to move from the transmit-side camera 1A to the receive-side camera 1B.

FIGS. 9A to 15D illustrate how a transfer thumbnail image is displayed. Portions in these Figures that are identical with those shown in FIG. 3 are designated by like reference characters and need not be described again. Further, although a transfer thumbnail image is being displayed on the display screen 7A of transmit-side camera 1A not only when main image data is being sent and received but also when transfer thumbnail image data is being sent and received, the transfer thumbnail image need not necessarily be displayed when transfer thumbnail image data is sent and received. It goes without saying that these displays of images can be implemented by mapping the transfer thumbnail image data to memory, as mentioned above.

Figure 9A:
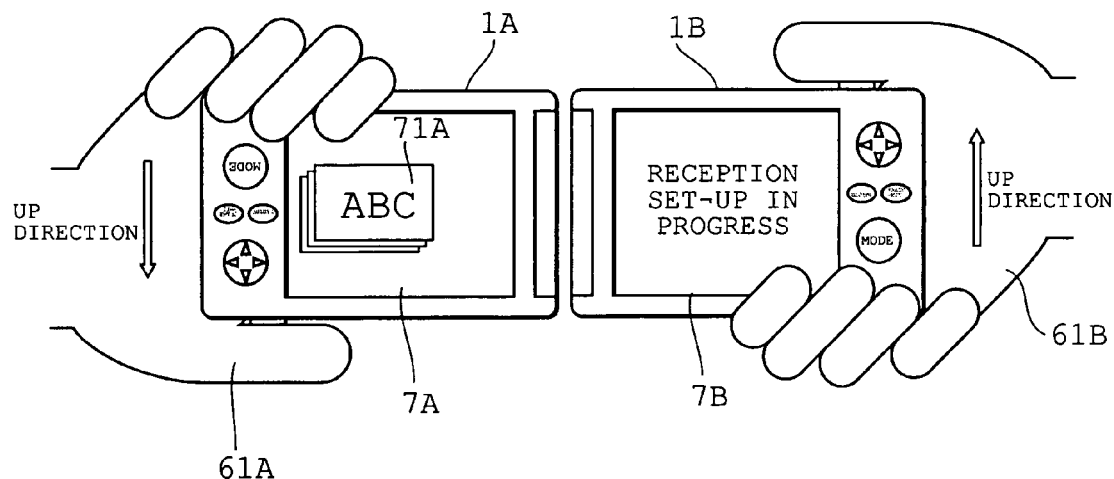
FIGS. 9A and 9B illustrate the manner in which image data is sent and received.

FIG. 9A illustrates the situation when transfer thumbnail image data is sent and received.

A transfer thumbnail image 71A that has been turned upside-down is displayed on the display screen 7A on the transmitting side. In a case where the user has selected a plurality of frames of the transfer thumbnail image data, the upside-down transfer thumbnail images 71A are displayed in a form in which they are stacked. Users 61A and 16B can ascertain that preparations for transmitting the main image data are being made by observing the transfer thumbnail images 71A.

When transfer thumbnail image data is sent and received, main image data will not yet have been received by the receive-side camera 1B. Accordingly, text reading "RECEPTION SET-UP IN PROGRESS" is displayed instead of a transfer thumbnail image on the receive-side camera 1B.

Figure 9B:
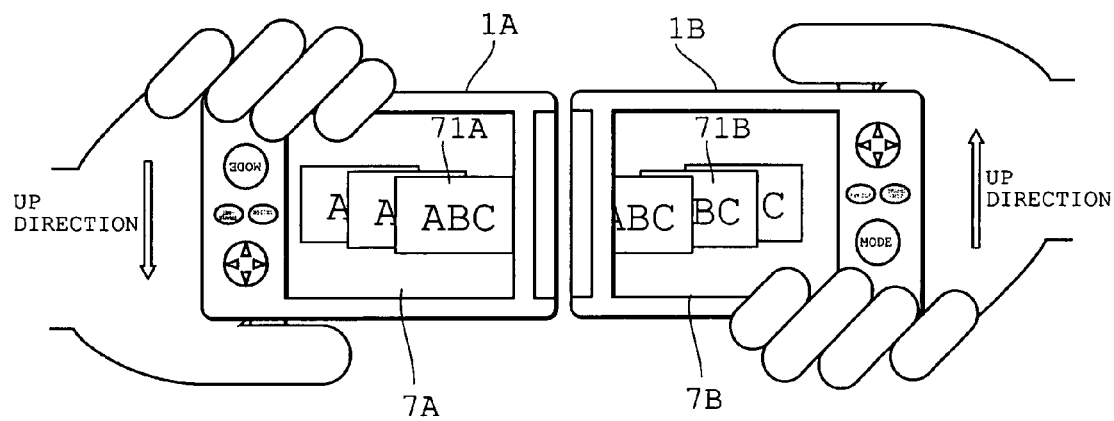

FIG. 9B illustrates the situation when main image data is sent and received.

An image in which the transfer thumbnail images 71A that were stacked at the sending and receiving of the transfer thumbnail image data are moved one frame at a time toward the side of the input/output portion 8A is displayed on the transmit-side display screen 7A.

An image in which transfer thumbnail images 71B move away from the side of the input/output portion 8B one frame at a time is displayed on the receive-side display screen 7B.

Since the transfer thumbnail image 71A that has been turned upside-down is displayed on the transmit-side display screen 7A, movement seems natural and it appears just as if the image per se is moving from the transmit-side camera 1A to the receive-side camera 1B.

FIGS. 10A to 10D illustrate another modification. Portions in these Figures that are identical with those shown in FIG. 3 are designated by like reference characters and need not be described again.

Figure 10A:
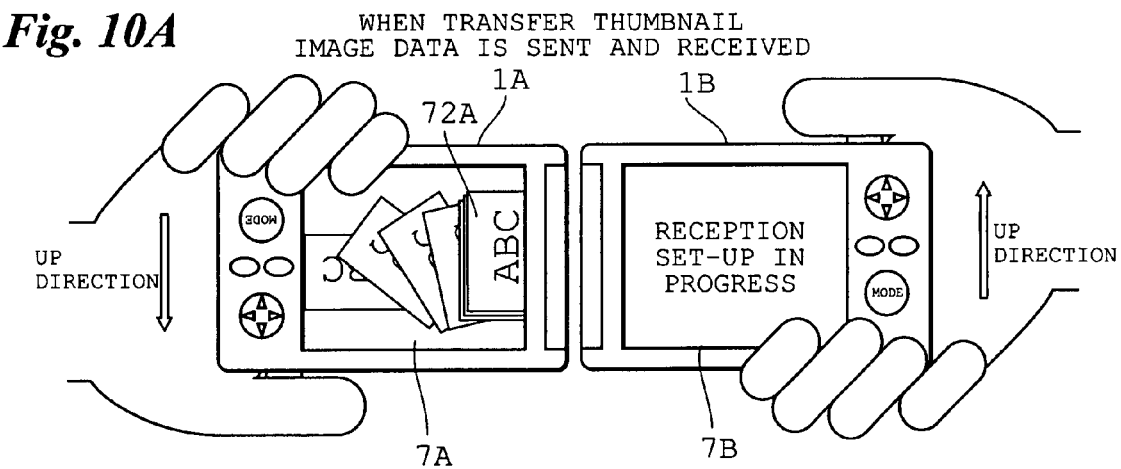
FIGS. 10A and 10C illustrate the manner in which image data is sent and received.

FIG. 10A illustrates the situation when transfer thumbnail image data is sent and received.

Displayed on the transmit-side display screen 7A is an image in which transfer thumbnail images 72A are stacked by being rotated clockwise by 90° from the upright attitude. Text reading "RECEPTION SET-UP IN PROGRESS" is displayed on the receive-side display screen 7B.

Figure 10B:
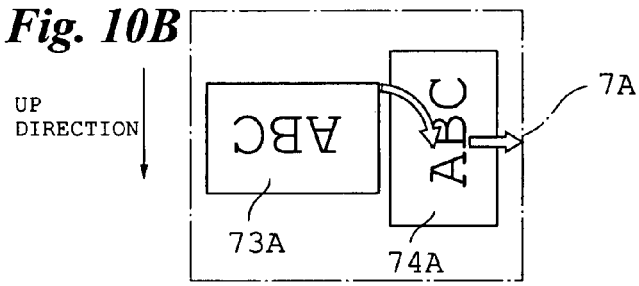
FIG. 10B illustrates an example of a display screen on the transmit side.

FIG. 10B illustrates the transmit-side display screen 7A shown in FIG. 10A.

A transfer thumbnail image 73A prior to rotation is in an upright attitude in which the up direction of the transmit-side camera 1A is the up direction of the image. By moving the transfer thumbnail image 73A to the input/output portion 8A while the image is being rotated, a transfer thumbnail image 74A that has been rotated 90° from the upright attitude is obtained. However, the 90° clockwise rotation ends before the transfer thumbnail image 74A contacts the right side of the display screen 7A. The transfer thumbnail image 74A thus rotated moves to the right side of the display screen 7A subsequently. As described above, the transfer thumbnail image 74A is stacked when the transfer thumbnail image data is transmitted.

Figure 10C:
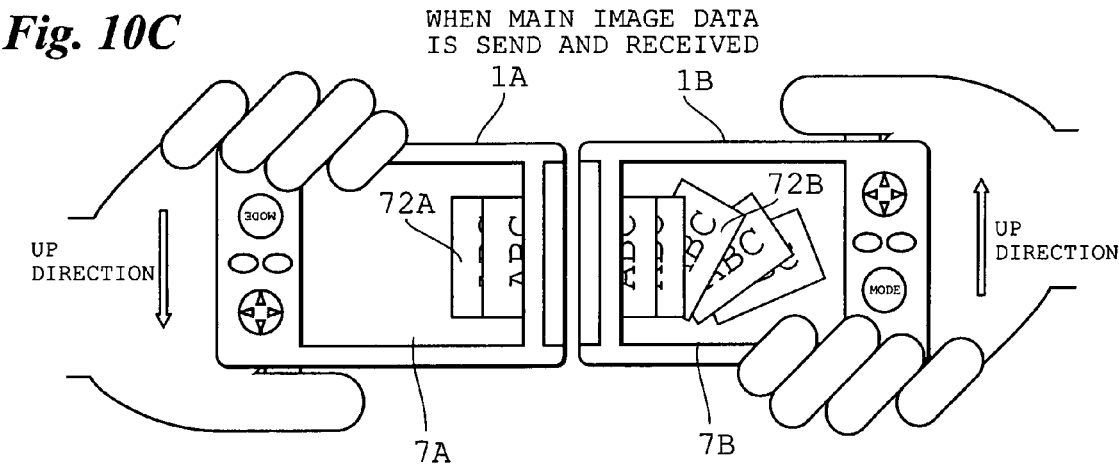

FIG. 10C illustrates the situation when main image data is sent and received.

The transfer thumbnail images 72A are displayed on the transmit-side display screen 7A in stacked form in the manner described above. An image in which the stacked transfer thumbnail images 72A are moved one frame at a time toward the side of the input/output portion 8A is displayed.

Displayed on the receive-side display screen 7B is an image in which the vertically oriented transfer thumbnail images 72B become upright while being rotated clockwise by 90°.

Figure 10D:
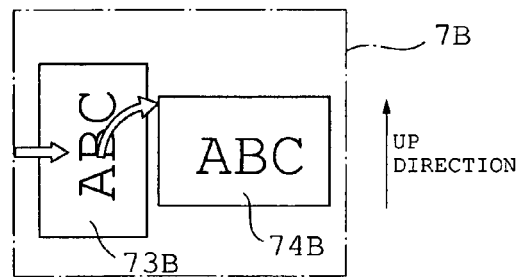
FIG. 10D illustrates an example of a display screen on the receive side.

FIG. 10D illustrates the receive-side display screen 7B shown in FIG. 10C.

A transfer thumbnail image 73B situated on the left side of the display screen 7B (the side on which the input/output portion 8B is located) is being, displayed in the vertical orientation in the manner described above. After the image is moved in this vertically orientated state, it is moved away from the input/output portion 8B while being rotated clockwise by 90°, whereby an upright transfer thumbnail image 74B is obtained.

Figure 11A:
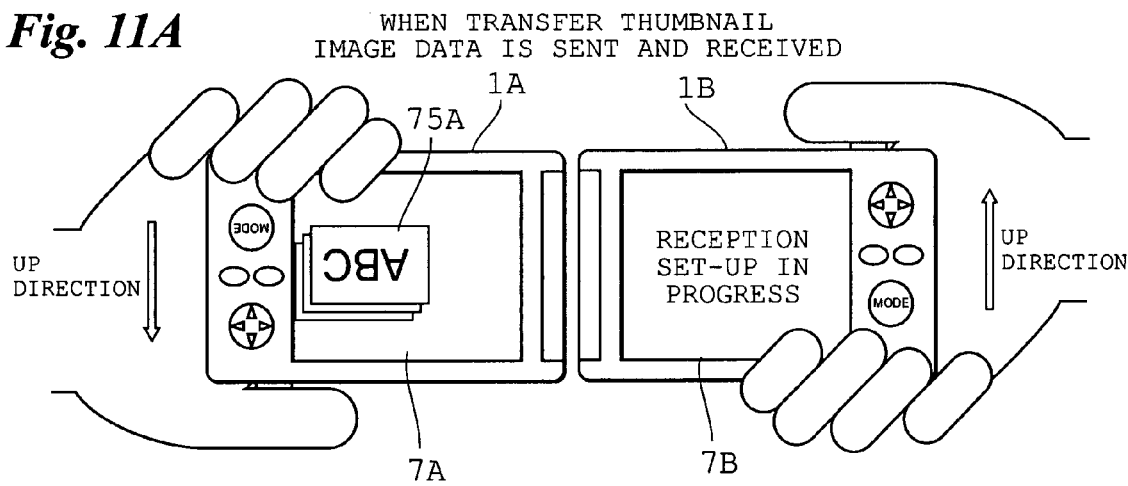
FIGS. 11A and 11B illustrate the manner in which image data is sent and received.
Figure 11B:
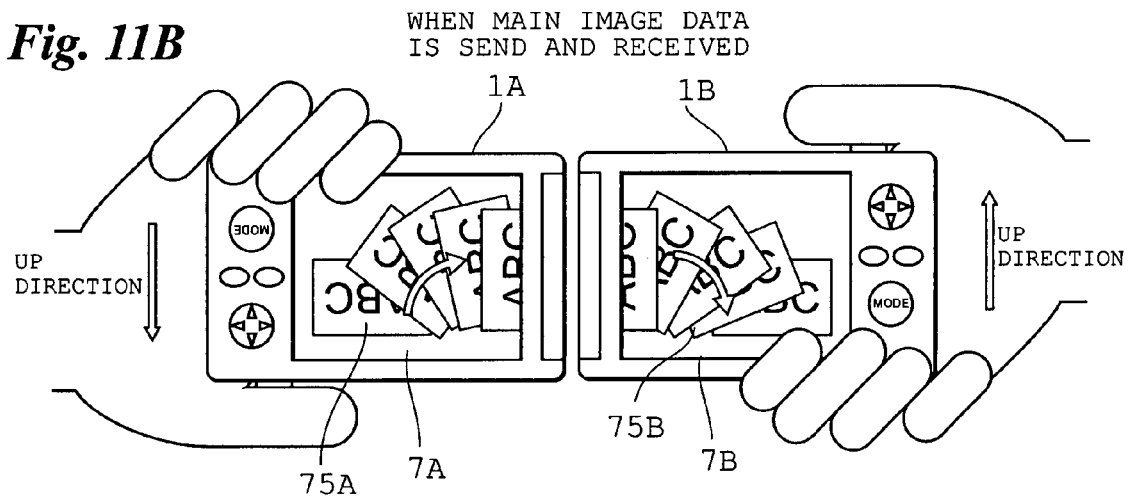
Figure 11C:
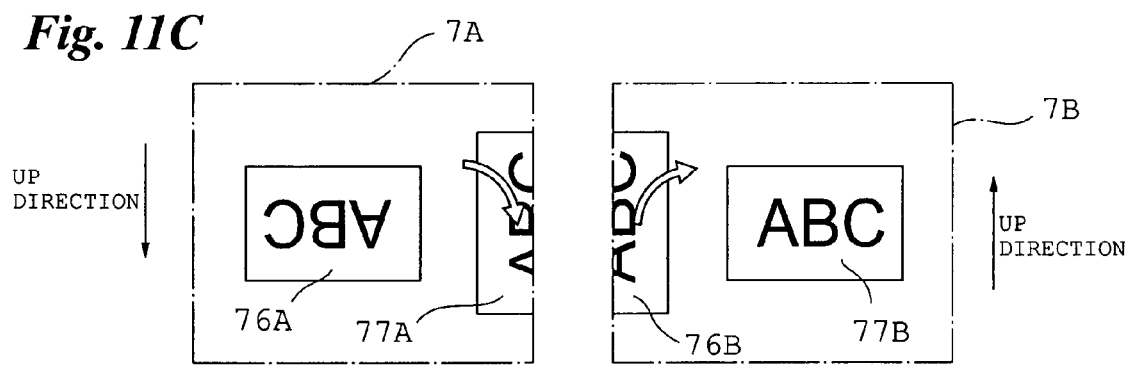
FIG. 11C illustrates examples of display screens on the transmit and receive sides, respectively.

FIGS. 11A to 11C illustrate a further modification.

FIG. 11A illustrates the situation when transfer thumbnail image data is sent and received.

When transfer thumbnail image data is sent and received, an image in which transfer thumbnail images 75A are stacked one upon another is displayed on the transmit-side display screen 7A. Text reading "RECEPTION SET-UP IN PROGRESS" is displayed on the receive-side display screen 7B.

FIG. 11B illustrates the situation when main image data is sent and received.

When main image data is sent and received, the transfer thumbnail image 75A is displayed on the transmit-side display screen 7A while being rotated clockwise by 90° from the upright state. A transfer thumbnail image 75B is displayed on the receive-side display screen 7B while being rotated clockwise by 90° from the vertical state to the upright state.

FIG. 11C illustrates the transmit-side display screen 7A and the receive-side display screen 7B.

As mentioned above, an upright transfer thumbnail image 76A is displayed on the transmit-side display screen 7A and a transfer thumbnail image 77A that has been rotated clockwise by 90° is displayed on the transmit-side display screen 7A. A vertical transfer thumbnail image 76B is displayed on the receive-side display screen 7B. By rotating this transfer thumbnail image 76B clockwise by a further 90°, a transfer thumbnail image 77B in the upright state is obtained.

Figure 12A:
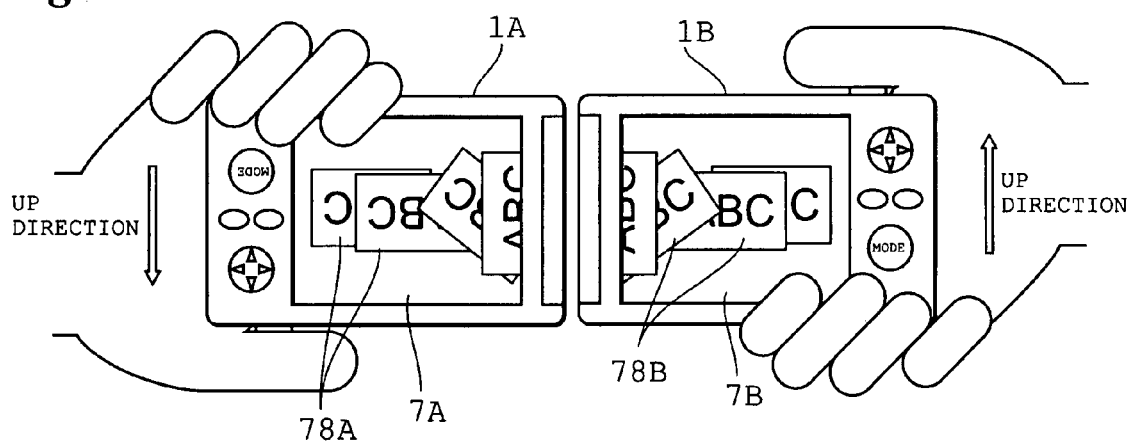
FIG. 12A illustrates the manner in which image data is sent and received.
Figure 12B:
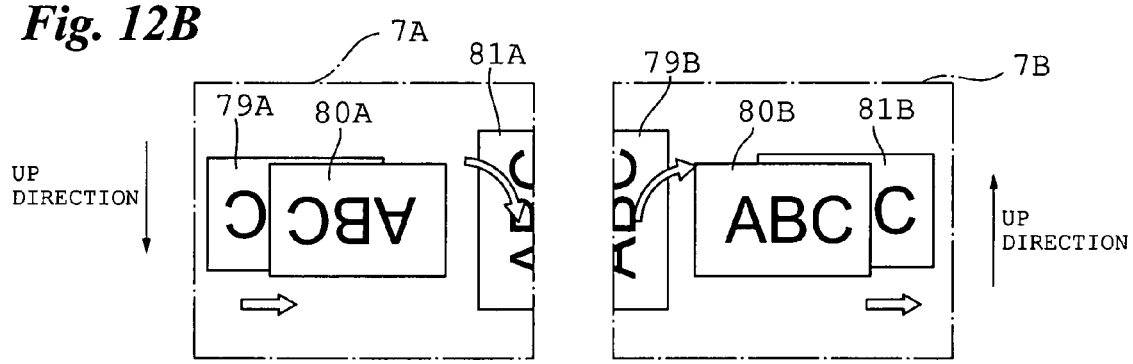
FIG. 12B illustrates examples of display screens on the transmit and receive sides, respectively.

FIGS. 12A and 12B illustrate another modification. In this modification, the situation when transfer thumbnail image data is sent and received is the same as that shown in FIG. 11A.

FIG. 12A illustrates the situation when main image data is sent and received.

Displayed on the transmit-side display screen 7A and receive-side display screen 7B are images in which transfer thumbnail images 78A and 78B are moved from the transmit-side camera 1A to the receive-side camera 1B while being rotated.

FIG. 12B illustrates the transmit-side display screen 7A and the receive-side display screen 7B.

On the transmit-side display screen 7A, transfer thumbnail images 79A, 80A in the upright state are rotated clockwise by 90° to obtain a transfer thumbnail image 81A. The transfer thumbnail image 81A thus rotated by 90° is not moved laterally in the 90°-rotated state but becomes a vertically orientated transfer thumbnail image 79B on the receive-side display screen 7B. Transfer thumbnail images 80B, 81B that have been rotated by a further 90° are displayed on the receive-side display screen 7B.

Figure 13A:
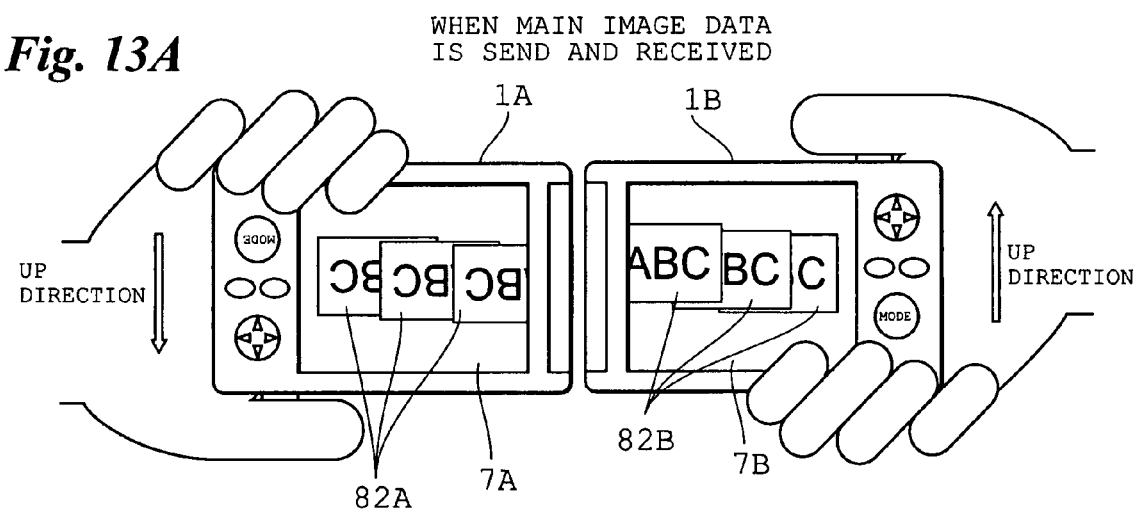
FIG. 13A illustrates the manner in which image data is sent and received.
Figure 13B:
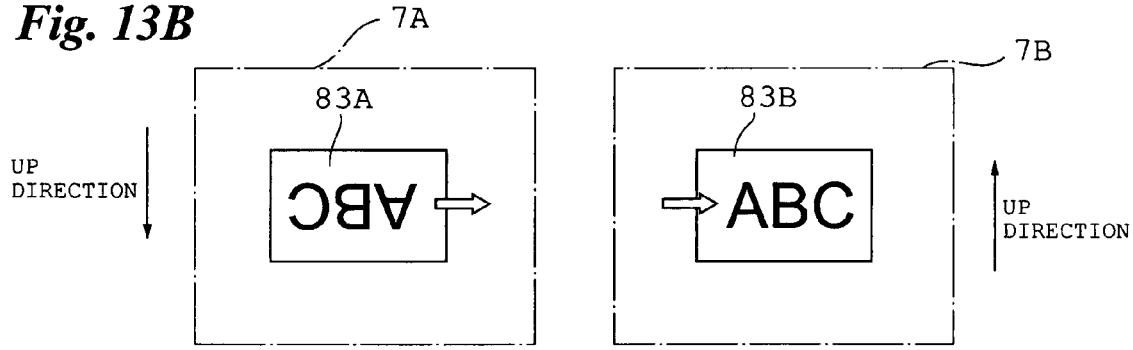
FIG. 13B illustrates examples of display screens on the transmit and receive sides, respectively.

FIGS. 13A and 13B illustrate a further modification. In this modification, the situation when transfer thumbnail image data is sent and received is the same as that shown in FIG. 11A.

FIG. 13A illustrates the situation when main image data is sent and received.

A state in which transfer thumbnail images 82A in the upright attitude are being moved toward the input/output portion 8A one frame at a time is displayed on the transmit-side display screen 7A. A state in which transfer thumbnail images 82B in the upright attitude are being moved away from the input/output portion 8B one frame at a time is displayed on the receive-side display screen 7B.

FIG. 13B illustrates the transmit-side display screen 7A and the receive-side display screen 7B.

As mentioned above, a transfer thumbnail image 83A is moved in the upright attitude toward the input/output portion 8A on the transmit-side display screen 7A. A transfer thumbnail image 83B is moved in the upright state on the receive-side display screen 7B.

FIG. 14 illustrates a further modification and shows the situation when main image data is sent and received. The situation when transfer thumbnail image data is sent and received is the same as that shown in FIG. 11A.

Displayed on the transmit-side display screen 7A is an image in which transfer thumbnail images 84A in the upright state become gradually smaller while being moved toward the input/output portion 8A. Displayed on the receive-side display screen 7B are transfer thumbnail images 84B in which the transfer thumbnail images that become gradually smaller on the transmit-side display screen 7A move away from the input/output portion 8B while becoming gradually larger. It goes without saying that this size-reduction processing also is executed in the image processing unit 13.

FIGS. 15A to 15D illustrate a further embodiment.

FIG. 15A illustrates the situation when transfer thumbnail image data is sent and received.

Displayed on the transmit-side display screen 7A is an image in which transfer thumbnail images 85A in the upright state are rotated clockwise (or counter-clockwise) by 180° (i.e., in which the images 85A are turned upside-down). The wording "RECEPTION SET-UP IN PROGRESS" is displayed on the receive-side display screen 7B. Transfer thumbnail images 85A that have been turned upside-down are stacked.

FIG. 15B illustrates the transmit-side display screen 7A.

A transfer thumbnail image 86A is in the upright state. By rotating the upright transfer thumbnail image 86A clockwise or counter-clockwise by 180°, a transfer thumbnail image 87A that has been turned upside-down is displayed on the transmit-side display screen 7A.

FIG. 15C illustrates the situation when main image data is sent and received.

Displayed on the transmit-side display screen 7A is an image in which transfer thumbnail images 85A that have been turned upside-down move one frame at a time toward the input/output portion 8A. Displayed on the receive-side display screen 7B is an image in which transfer thumbnail images 85B in the upright state move laterally away from the input/output portion 8B one frame at a time.

FIG. 15D illustrates an example of the receive-side display screen 7B.

As mentioned above, a transfer thumbnail image 86B is upright, and the upright transfer thumbnail image 86B moves so as to depart from the input/output portion 8B (to become a transfer thumbnail image 87B).

In the foregoing embodiment, image data is sent and received using a digital still camera. However, it may be so arranged that image data is sent and received using another portable device. Further, although image data is sent and received using infrared communication in the foregoing embodiments, image data may be sent and received using wired communication.

As many apparently widely different embodiments of the present invention can be made without departing from the spirit and scope thereof, it is to be understood that the invention is not limited to the specific embodiments thereof except as defined in the appended claims.

What is claimed is:

1. A portable image communication system comprising a portable image transmitting unit and a portable image receiving unit, wherein said portable image transmitting unit has a thumbnail image data transmitting device for transmitting thumbnail image data, which represents a transfer thumbnail image corresponding to a main image, to said portable image receiving unit; and said portable image receiving unit includes:
a thumbnail image data receiving device for receiving thumbnail image data that has been transmitted from said thumbnail image data transmitting device of said portable image transmitting unit; and
a reception-end data transmitting device for transmitting reception-end data to said portable image transmitting unit in response to end of reception of the thumbnail image data by said thumbnail image data receiving device;

said portable image transmitting unit further includes:
an end-data receiving device for receiving reception-end data that has been transmitted from said reception-end data transmitting device;
a main image data transmitting device for transmitting main image data, which represents the main image, to said portable image receiving unit in response to reception of the reception-end data by said end-data receiving device; and
a transmit-side display unit for displaying the transfer thumbnail image in such a manner that the transfer thumbnail image gradually disappears while moving in one direction on a display screen in response to transmission of the main image data by said main image data transmitting device; and said portable image receiving unit further includes:
main image data receiving device for receiving main image data that has been transmitted from said portable image transmitting unit; and
a receive-side display unit for displaying the transfer thumbnail image in such a manner that the transfer thumbnail image gradually appears while moving in one direction on a display screen in response to reception of the main image data by said main image data receiving device.

2. A portable image transmitting unit comprising:
a thumbnail image data transmitting device for transmitting thumbnail image data, which represents a transfer thumbnail image corresponding to a main image, to a portable image receiving unit;
an end-data receiving device for receiving reception-end data, which indicates end of reception of the thumbnail image data, transmitted from said portable image receiving unit in response to transmission of thumbnail image data from said thumbnail image data transmitting device to said portable image receiving unit;
a main image data transmitting device for transmitting main image data, which represents the main image, to said portable image receiving unit in response to reception of the reception-end data by said end-data receiving device; and
a transmit-side display unit for displaying the transfer thumbnail image in such a manner that the transfer thumbnail image gradually disappears while moving in one direction on a display screen in response to transmission of the main image data by said main image data transmitting device.

3. The unit according to claim 2, wherein said thumbnail image data transmitting device and said main image data transmitting device comprise a wireless communication device provided on an end face of the portable image transmitting unit; and said transmit-side display unit displays the transfer thumbnail image in such a manner that the thumbnail image gradually disappears while moving on the display screen toward the side on which said wireless communication device has been provided, in response to transmission of the main image data by said main image data transmitting device.

4. The unit according to claim 3, further comprising a display control device for controlling said transmit-side display unit in such a manner that images obtained by turning transfer thumbnail images upside-down are displayed in a gradually stacked manner while moving on the display screen toward the side on which said wireless communication device has been provided, in response to transmission of the transfer thumbnail image data by said thumbnail image data transmitting device.

5. The unit according to claim 3, wherein said transmit-side display unit displays the transfer thumbnail image in such a manner that the transfer thumbnail image data moves on the display screen toward the side on which said wireless display device has been provided while it is rotated clockwise by 90° from an upright attitude, and gradually disappears before or after rotation ends, in response to transmission of the main image data by said main image data transmitting device.

6. The unit according to claim 5, wherein said transmit-side display unit subjects the transfer thumbnail image to the rotation processing after movement thereof starts.

7. The unit according to claim 3, wherein said transmit-side display unit displays the transfer thumbnail image in such a manner that the transfer thumbnail image disappears while it is gradually reduced in size and moving on the display screen toward the side on which said wireless communication device has been provided, in response to transmission of the main image data by said main image data transmitting device.

8. The unit according to claim 3, further comprising a display control device for controlling said display unit in such a manner that the transfer thumbnail image is displayed in a stacked manner while being rotated from an upright state to an inverted state while moving on the display screen toward the side on which said wireless communication device has been provided, in response to transmission of the thumbnail image data by said thumbnail image data transmitting device.

9. The unit according to claim 3, further comprising a display control device for controlling said display unit in such a manner that the transfer thumbnail image is displayed in a stacked manner while being rotated clockwise by 90° from an upright attitude, in response to transmission of the thumbnail image data by said thumbnail image data transmitting device.

10. A portable image receiving unit comprising:

a thumbnail image data receiving device for receiving thumbnail image data, which represents a transfer thumbnail image corresponding to a main image, transmitted from a portable image transmitting unit;

a reception-end data transmitting device for transmitting reception-end data to said portable image transmitting unit in response to end of reception of the thumbnail image data by said thumbnail image data receiving device;

a main image data receiving device for receiving main image data transmitted from said portable image transmitting unit in response to transmission of reception-end data from said reception-end data transmitting device to said portable image transmitting unit; and a receive-side display unit for displaying the transfer thumbnail image in such a manner that the transfer thumbnail image gradually appears while moving in one direction on a display screen in response to reception of the main image data by said main image data receiving device.

11. The unit according to claim 10, wherein said thumbnail image data receiving device and said main image data receiving device comprise a wireless communication device provided on an end face of the portable image receiving unit; and said receive-side display unit displays the transfer thumbnail image in such a manner that the transfer thumbnail image gradually appears while moving on the display screen toward a side opposite the side on which said wireless communication device has been provided in response to reception of the main image data by said main image data receiving device.

12. The unit according to claim 10, wherein said receive-side display unit displays the transfer thumbnail image in such a manner that an image obtained by turning the transfer thumbnail image upside-down gradually appears while moving on the display screen toward a side opposite the side on which said wireless communication device has been provided in response to reception of the main image data by said main image data receiving device.

13. The unit according to claim 10, wherein said receive-side display unit displays the transfer thumbnail image in such a manner that the transfer thumbnail image, which has been rotated clockwise by 90° from an upright attitude, gradually appears while moving on the display screen toward a side opposite the side on which said wireless communication device has been provided, and displays the transfer thumbnail image in the upright attitude while rotating the thumbnail image clockwise by a further 90° before one frame of the transfer thumbnail image appears completely or after it has appeared completely, in response to reception of the main image data by said main image data receiving device.

14. The unit according to claim 13, wherein said receive-side display unit moves the transfer thumbnail image toward a side opposite the side on which the wireless communication device has been provided after rotation of the transfer thumbnail image clockwise by 90° has been completed.

15. The unit according to claim 11, wherein said receive-side display unit displays the transfer thumbnail image in such a manner that the transfer thumbnail image appears while it is gradually increased in size and moving on the display screen, in response to reception of the main image data by the main image data receiving device.

16. A method of controlling a portable image transmitting unit, comprising:

transmitting thumbnail image data, which represents a transfer thumbnail image corresponding to a main image, to a portable image receiving unit;

receiving reception-end data that indicates end of transmission of the thumbnail image data that is transmitted from the portable image receiving unit in response to transmission of the thumbnail image data to the portable image receiving unit;

transmitting main image data representing the main image to the portable image receiving unit in response to reception of the reception-end data; and displaying the transfer thumbnail image in such a manner that the transfer thumbnail image gradually disappears while moving in one direction on a display screen in response to transmission of the main image data.

17. A method of controlling a portable image receiving unit, comprising:

receiving thumbnail image data representing a transfer thumbnail image corresponding to a main image that has been transmitted from a portable image transmitting unit;

transmitting reception-end data to the portable image transmitting unit in response to end of reception of the thumbnail image data;

receiving main image data, which is transmitted from the portable image transmitting unit, in response to transmission of the reception-end data to the portable image transmitting unit; and displaying the transfer thumbnail image in such a manner that the transfer thumbnail image gradually appears while moving in one direction on a display screen in response to reception of the main image data.

* * * * *